April 18, 1939.　　　J. H. KOLSETH　　　2,155,314
BATTERY TESTER
Filed Dec. 15, 1937　　　3 Sheets-Sheet 1

April 18, 1939.                J. H. KOLSETH                2,155,314
                                BATTERY TESTER
                            Filed Dec. 15, 1937            3 Sheets-Sheet 2
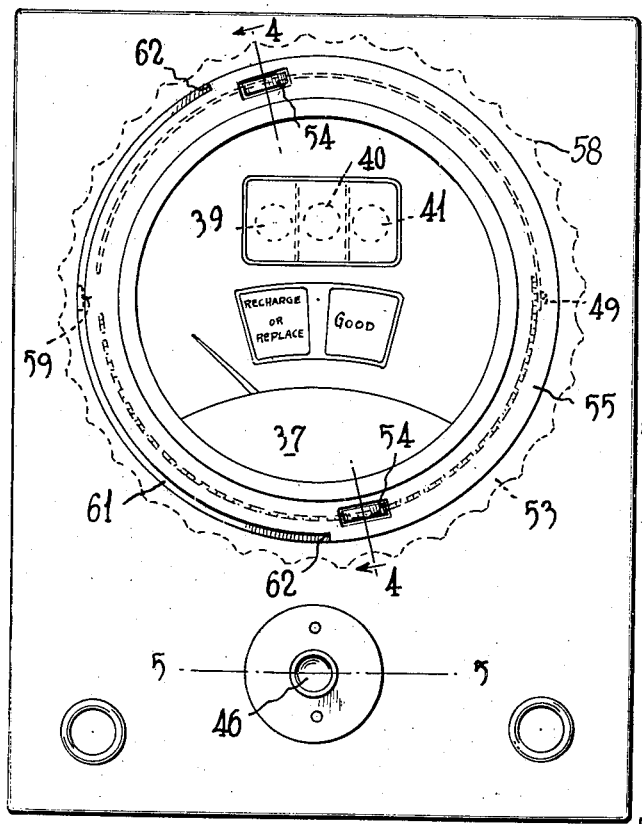
Fig. 2
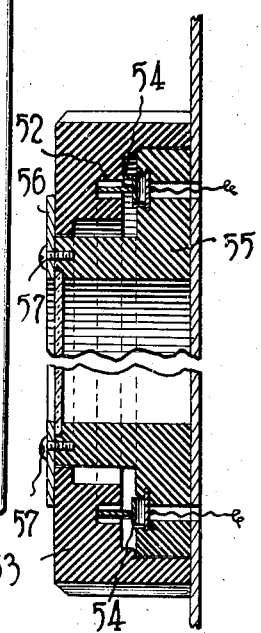
Fig. 4.
Fig. 3.
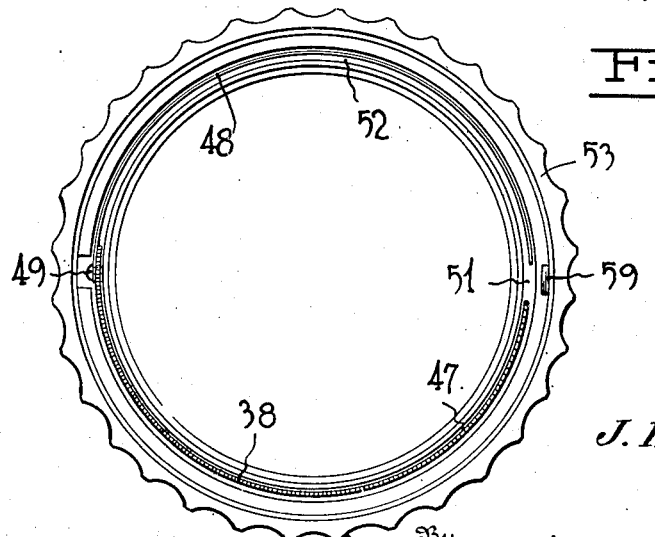
Inventor
J. H. Kolseth,
By Seymour, Bright + Nottingham
                                Attorneys April 18, 1939.     J. H. KOLSETH     2,155,314
BATTERY TESTER
Filed Dec. 15, 1937     3 Sheets-Sheet 3
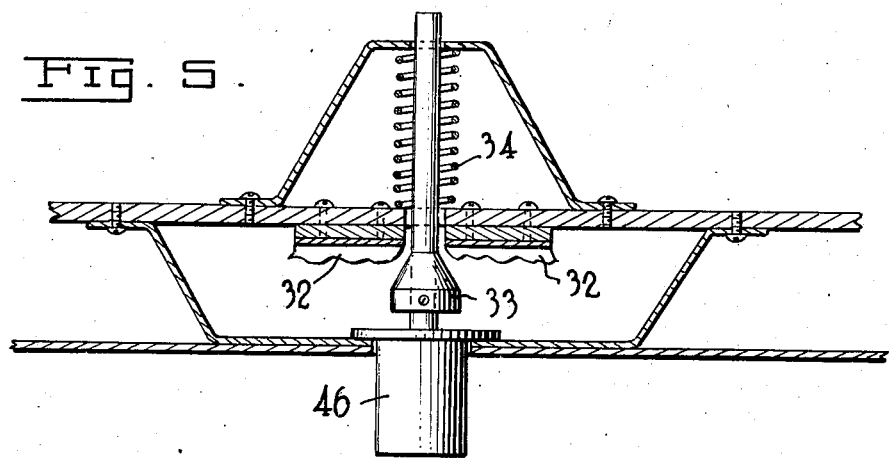
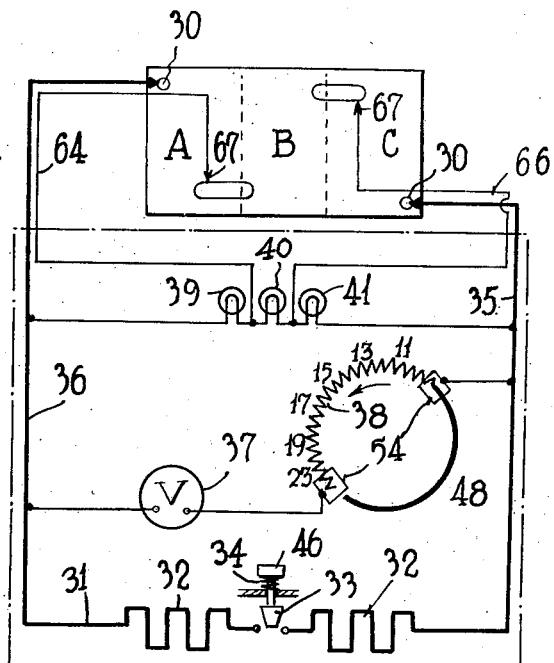
Inventor
J. H. Kolseth,
By Seymour, Bright & Nottingham
Attorneys Patented Apr. 18, 1939

2,155,314

UNITED STATES PATENT OFFICE 2,155,314

BATTERY TESTER

John H. Kolseth, Newark, N. J., assignor to Atlas Supply Company, Newark, N. J., a corporation of Delaware Application December 15, 1937, Serial No. 180,037

7 Claims. (Cl. 175—183)

The present invention relates to battery testers and more particularly pertains to improvements in the mechanical structure of such devices.

As it is well known, in storage batteries intended for use in automotive practice, there are different sizes, and the size of the battery depends upon the number of plates, which usually range in odd numbers from eleven to twenty-three per cell.

In the design of starters and other electrical appliances used in modern automobiles, the desired operation is based upon an assumed voltage of approximately 1.8 volts per cell, or for three cells in series; this assumed voltage is 5.4 volts. With a new battery fully charged, the open circuit voltage per cell is approximately 2.2 volts (or for three cells connected in series, approximately 6.6 volts) so that under operating conditions there may be an overall drop of 1.2 volts (0.4 volt per cell) before the voltage has fallen to the assumed standard for which the electrical equipment of the automobile is designed.

From time to time automotive batteries must be tested to determine their condition. A test which is commonly used to determine the condition of an automobile storage battery is to apply a predetermined load in amperes that approximates the load imposed on the battery in starting service and to observe the voltage at the battery terminals when the battery is so loaded.

In making such a test, the battery may be connected in series with an ammeter and an adjustable resistance. The resistance is then adjusted until the ammeter indicates that the battery is delivering the predetermined load in amperes. As the predetermined value to which the current is adjusted, depends upon the number of plates in the storage battery being tested, the scale of the ammeter used may be calibrated in number of plates rather than amperes. The voltage at the battery terminals is then read from a voltmeter which is connected across the battery and compared with a value that experience and test indicate to be a proper standard value.

If the resistance in the test circuit above described is adjusted until the ammeter indicates that the battery is delivering the predetermined test current for a fifteen plate battery and then a normal seventeen plate battery is substituted for the normal fifteen plate battery without changing the value of the resistance, the voltmeter will indicate a higher value than for the fifteen plate battery. Now, if it is desired to use the same instrument scales and to have the scale markings indicate the same conditions for the seventeen plate battery as they did for the fifteen plate battery, it is necessary to introduce a resistance or multiplier into the circuit of the voltmeter. Conversely if a normal thirteen plate battery is substituted for the fifteen plate battery without changing the value of the resistance the voltmeter will indicate a lower value than for the fifteen plate battery, and if it is desired to use the same instrument scales and to have the same scale markings indicate the same condition for the thirteen plate battery as it did for the fifteen plate battery, it is necessary to decrease the resistance of the voltmeter circuit.

From the foregoing, it is apparent that if the testing device is to be used for batteries of various sizes (number of plates), that a fixed resistance should be connected across the battery terminals and an adjustable resistance or multiplier should be connected in the voltmeter circuit.

By so employing in series with the voltmeter a simple adjustable resistance, the latter may be adjusted so as to increase or decrease the resistance of the voltage circuit to compensate for the different size of battery and thus adapt the battery tester for the testing of batteries of widely different capacities. An adjustable resistance or rheostat thus used becomes in fact a battery size selector and therefore the various points of adjustment may be conveniently marked with the notations "11 plate" "13 plate" "15 plate" and so on for the convenience of the operator. Such a circuit is illustrated in Fig. 6.

If desired, a simple switch may be employed in the load circuit to permit a voltage reading to be secured under open circuit conditions. It will be also understood that the tester may be arranged to indicate the condition of each individual cell, as for example, by employing a small low resistance lamp connected across each cell so that the operator may be informed by the respective brightness of these lamps whether any particular cell or cells of the group are good or bad.

The critical condition of a battery is confined within quite narrow limits and when tested under charged conditions, a difference in voltage drop of only two tenths of one volt may indicate the difference between a fairly good battery and one that is hopelessly defective. Thus, if the voltmeter indications are arranged in arithmetical order from zero to seven, a difference of two-tenths on the scale would represent less than three per cent of the entire scale, which to the layman would be wholly without significance.

Therefore, use of a special type of voltmeter is preferred, which will operate in such a way that the movements of the pointer in connection with the critical portion of the scale will be greatly extended. For instance, voltmeters may be employed having scales extending over an angle of 86 degrees from zero to 6.5 where the critical portions of the scale covers an angle of 33 degrees.

In order to obtain such results, use is made of a meter of the movable coil type where the core between the pole pieces is formed with a slot so as to greatly weaken the flux when the coil is coincident therewith. In this way a disproportionately greater voltage rise is required to move the coil past the space occupied by the slot than when the coil cooperates with the unslotted part of the core.

An object of the present invention is to provide a battery tester embodying the theoretical principles hereinabove referred to, wherein the constructional arrangement of such testing apparatus is compact and simplified so that the average individual may readily operate the apparatus and readily understand the condition of the battery under test.

Another object of the invention is to provide a battery tester wherein the arrangement of the means for determining the condition of the battery as a whole and of the individual cells thereof are in close relation to the means for indicating that the tester is properly regulated for testing a battery of the size undergoing test.

Another object of the invention resides in the provision of rugged means for carrying out the battery testing operation and particularly to provide an adjustable resistor which will function in connection with the voltmeter to properly indicate the condition of a battery under test.

A more specific object of the invention resides in the provision of a battery testing device which may be easily manufactured with a minimum number of parts which will at the same time provide an accurate indication of the condition of a battery.

Other and further features and objects of the invention will be more apparent to those skilled in the art upon a consideration of the accompanying drawings and the following description, wherein and exemplary embodiment of the invention is disclosed.

In the drawings:

Fig. 2 is a view in front elevation illustrating the manner in which the calibrated resistance is mounted.

Fig. 3 is a rear view of the dial member showing mounting of the resistor.

Fig. 4 is a sectional view of the dial member taken on the lines 4—4 of Fig. 2.

Fig. 5 is an elevational view illustrating the load circuit switch.

Fig. 6 is schematic diagram illustrating the testing circuits of the apparatus.

Figure 1:
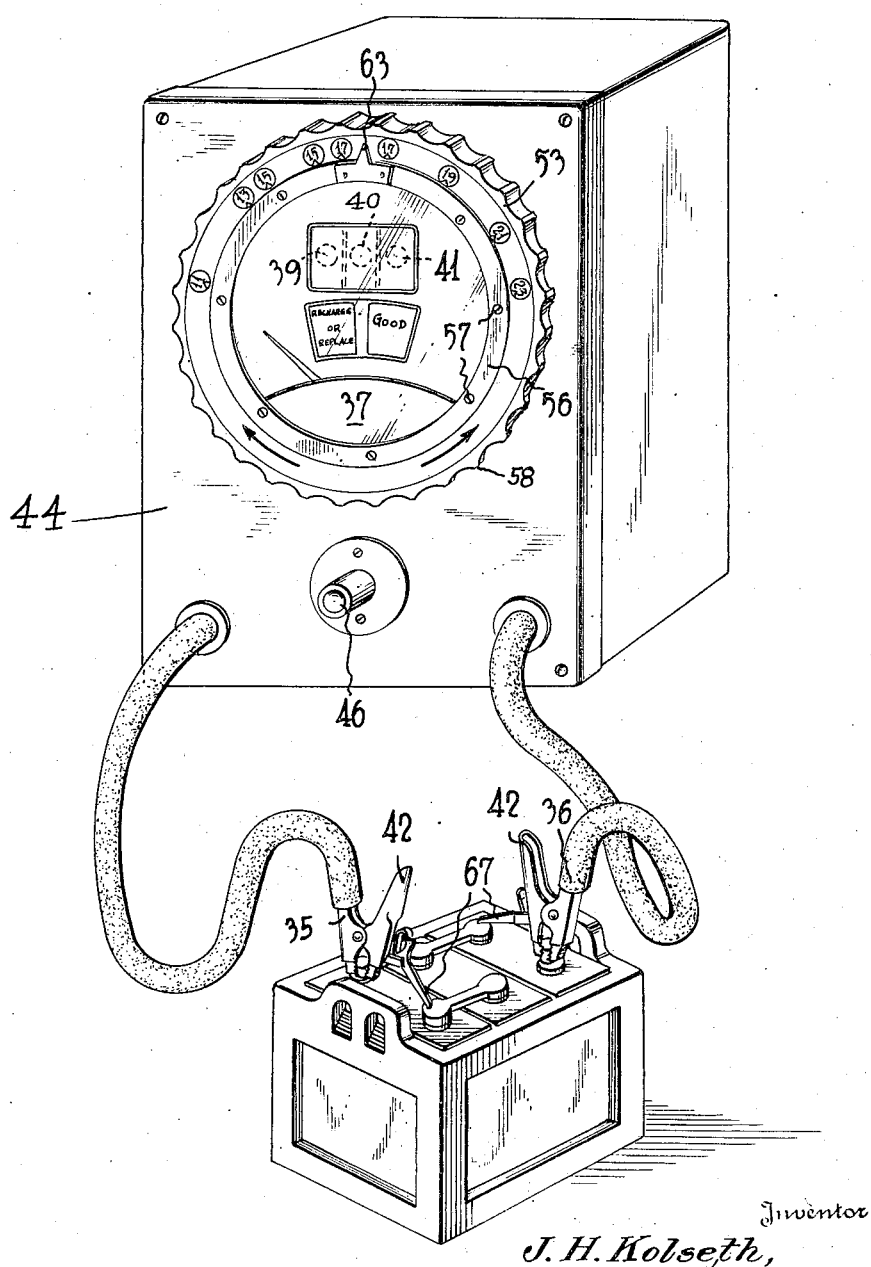
Fig. 1 is a perspective view illustrating a constructional form of tester associated with a battery.

Referring to Fig. 6, there is represented a storage battery having cells A, B and C connected in series in the usual manner. From the terminals 30 extend a current circuit 31. Connections may be provided with the terminals 30 by means of well known clips, such as illustrated in Fig. 1. In the circuit 31 is a fixed resistance 32 so calibrated that when the circuit is closed from a battery having fifteen plate cells that the load imposed on the battery will closely approximate the load imposed in automobile starting service. The voltage drop per cell under charged conditions of the battery will be from 2.2 volts to 1.8 volts. A switch 33 may be located in the circuit 31 to close the load circuit for the battery and opened by a spring 34 to permit a voltage reading under open circuit conditions.

Extending between the leads 35 and 36 of the current circuit 31 is a voltage circuit having a voltmeter 37 included therein. In series with the voltage circuit there is provided an adjustable rheostat 38 having means for changing the values of the resistances that may be included in the voltage circuit. The rheostat 38 is in reality an adjustable multiplier and acts as a battery size selector. The adjustment of the resistance is therefore made to the points 11—23 when testing a battery having the plates of each cell corresponding to the plate indications of the resistance. The resistance of the voltage circuit is high so that only a few milliamperes will flow therethrough, and the resistance is such that when a current of closely approximating the load in starting service for a fifteen plate battery is passed through the current circuit 31 the voltmeter will indicate 5.4 volts if the battery being tested has fifteen plates per cell and is charged and in a good condition. If the battery is known to be charged, a voltage drop below a predetermined standard value suggests the need of replacement. Otherwise it may only indicate the need of recharging.

If a seventeen plate battery is under test and assuming it to be charged and in good condition, and with the resistor 38 set at the point 15, the current flow in the circuit 31 will remain approximately the same, but this will be insufficient to cause the same voltage drop. The actual indication will be higher. The resulting error may be corrected by moving the resistor to introduce additional resistances in the voltage circuit or to the point 17 on the rheostat. Under normal conditions, the voltmeter 37 would thus give the same reading for a seventeen plate battery as would be given for a fifteen plate battery. Accordingly it is necessary only to adjust the rheostat or battery size selector to introduce the needed additional resistance in the voltage circuit for batteries of greater plate capacity.

In a preferred form of the invention auxiliary means are provided for indicating the differences in the condition of the several cells. Such means, for example, may comprise small low voltage lamps 39, 40 and 41 connected respectively across each of the cells A, B and C. Differences in the brightness of these lamps will indicate that the bad condition of the battery may be the result of a poor condition of one or more of the three cells.

In carrying the theoretical principles of such a battery tester into a constructional embodiment, the arrangement may take the form of the apparatus shown particularly in Figs. 1 to 5. The current circuit 31 is provided by means of the clips 42 which are of a well known construction having heavy current leads 34 and 36 extending therefrom to complete the current circuit to the resistor 32 positioned inside of the cabinet of boxlike housing 44. The current circuit may be closed by depression of a switch button 46 which extends through an opening in the front cover of the cabinet. The switch button 46 is preferably provided in the front face of the apparatus as illustrated in Fig. 1 and depression of the button is adapted to connect the intermediate parts of the resistor by causing the wedge member 33 to bridge the adjacent ends of the resistor 32 as shown in Fig. 5.

The voltmeter 37 is preferably mounted on the front panel of the cabinet 44 immediately above the switch button 46. In actual practice the readings of the voltmeter may be marked "recharge" or "replace" and "good" as indicated in Fig. 1 of the drawings and arranged in a manner as hereinbefore described.

Referring particularly to Figs. 2-4, it will be noted that the resistor 38 shown diagrammatically in Fig. 6 is formed of wire wound spirally around an arcuate shape insulating circuit 47. One end of the resistor is electrically connected to an arcuate shape conductor 48 by means of a small bolt 49. The conductor 48 and the resistance circuit 47 are of such length and curved in such a manner as to form a circle having a gap 51 between the ends thereof. These parts of the resistor are mounted in an annular groove 52 formed in the underside of the dial member 53 which is of such a diameter as to extend around the face of the voltmeter 37. The dial member is preferably formed of insulating material such as being formed from molded plastics as for example a phenol-formaldehyde condensation product, and the groove 52 formed therein is of such depth as illustrated particularly in Fig. 4, as to permit the resistance support 47 and the conductor 48 to protrude slightly beyond the groove.

An electrical circuit is established through the resistor to complete the voltage circuit referred to in connection with Fig. 6 by means of the contacts 54. The contact members 54 are preferably yieldable and take the form of leaf springs which are fixed in an insulating support 55 fixed to the front panel 44. The spring contacts 54 are arranged in a circumferentially spaced relation with respect to each other around the face of the voltmeter 37 in such a position as to contact the resistance 38 and the conductor 48. One of the leads extending from one of the contact members is adapted to be connected to the voltmeter 37 and the lead extending from the other of the contacts is for the purpose of being connected to one of the connections extending from the battery such as the lead 35. Thus the resistor 38 is connected in series with the voltmeter 37 and by rotating the dial member 53 the resistance in series with the voltage circuit may be altered or adjusted.

The dial member is mounted for rotation about the voltmeter and held in place by means of an annular shape plate 56 which is fixed to the insulating support 55 by any well known means such as screws 57. The peripheral surface of the dial member may be provided with means for permitting more positive rotation thereof, such as the knob-like projections 58. Thus the dial member is held in a position encircling the face of the voltmeter and maintaining the rheostat 38 in an engaging position with the contacts 54. The inner face of the dial member may be provided with a projection 59 which moves in an annularly extending recess 61 which is provided with shoulders 62 at the ends thereof to limit the rotation of the dial member.

The front face of the dial member, as illustrated in Fig. 1, carries a series of markings 11-23 which correspond to the number of plates of the battery under test. The markings of the rheostat, as hereinabove described in connection with Fig. 6, are provided for readily adjusting the apparatus to test batteries of various capacities. The plate 56 which is rigidly fixed to the support 55 may be provided with a pointer 63, for indicating the position to which the dial member should be rotated for testing a battery of a given plate size.

The lamps referred to in connection with Fig. 6, are preferably mounted within the dial member in such a manner as to be readily observed in connection with the reading of the voltmeter. The circuit to the lamps may be established by the addition of two leads 64 and 66 which are respectively housed in the insulation covering the current leads 35 and 36. The voltage circuit of the end lamps 39 and 41 may be established by connecting these lamps to the current leads 35 and 36 within the housing or cabinet of the tester.

For greater accuracy the voltage circuit of the end lamps 39 and 41 may be established by separate leads direct to the battery terminals. Likewise the voltmeter circuit may be established by direct leads to the battery terminals rather than through the load circuit.

In operation of the device the terminal clips 42 are attached to the end terminals of the battery and the auxiliary contacts 67 thus provide the connections for the voltage supplied to the lamp 40. With the terminal clips in such a position and assuming that the battery is provided with eleven plates per cell, turning the dial member to such a point where the marking 11 is immediately above the pointer 63, will provide the proper amount of resistance in the voltage circuit. Thus by depressing the button 46 a load circuit 31 will be established and the voltage drop across the terminals of the battery will be read on the voltmeter. If the battery under test is one having 13 or possibly 15 plates, then a correct reading on the voltmeter may be established by turning the dial member 53 to a point corresponding to the number of plates of the battery under test.

The voltmeter encircled by the dial for regulating the resistance of the voltmeter circuit may be used not only in the battery testing apparatus, but in any electrical apparatus requiring the voltmeter, capable of adjustment, so as to provide for different tests. For example, the same arrangement is advantageous for use on voltmeters having several voltage scales, the dial showing for which scale the voltmeter is set and eliminating the necessity of making separate connections when different tests are to be performed.

It is to be understood that the invention as hereinabove described particularly in connection with the constructional form with which the testing operation may be performed, is set forth merely by way of example, and modifications may be made therein, by those skilled in the art. Such modifications may be made without departing from the spirit and scope of the invention as expressed in the appended claims.

What I claim and desire to secure by Letters Patent is:

1. In a battery tester, supporting means, a voltmeter mounted on said supporting means, a dial member rotatably mounted on the supporting means and operatively associated with said voltmeter, said dial member being calibrated to indicate the plate sizes of the battery to be tested, a plurality of yieldable contacts arranged in spaced relation on the supporting means in close proximity to the dial member, an arcuate shaped resistor carried by said dial member and adapted to engage said contacts, and connecting means extending between one of said contacts and said voltmeter whereby the value of resistance associated with the voltmeter may be changed by turning said dial member.

2. In a battery tester, a supporting panel having an opening therein, a voltmeter mounted on said panel with the face thereof arranged in said opening, a dial member encircling the face of said voltmeter and rotatably mounted on said panel, said dial member being calibrated to indicate the plate sizes of the battery to be tested, a plurality of yieldable contacts arranged in a fixed circumferential spaced relation around said voltmeter, an arcuate shaped resistor carried by said dial member and adapted to engage said contacts, connecting means extending between one of said contacts and said voltmeter whereby the value of resistance associated with the voltmeter may be changed by turning said dial member.

3. In a battery tester, supporting means, a dial member rotatably mounted on the supporting means and calibrated to indicate the plate sizes of the batteries to be tested, a voltmeter mounted within said dial member, a pair of spring contacts arranged on said supporting means adjacent the under-surface of said dial member, an arcuate shaped resistor carried by said dial member having a portion thereof extending rearwardly of the rear face thereof and adapted to engage said contacts, and connecting means extending between one of said spring contacts and said voltmeter, whereby the value of resistance associated with the voltmeter may be changed by rotating said dial member.

4. In a battery tester, supporting means, a voltmeter mounted on said supporting means, a circular shaped dial member so rotatably mounted on the supporting means in such a manner as to be turned about the face of said voltmeter, said dial member being calibrated to indicate the plate sizes of the battery to be tested, a plurality of yieldable contacts arranged in a spaced relation on said supporting means adjacent the rear surface thereof, said dial member having an arcuate shaped groove in the rear surface thereof, an arcuate shaped resistor mounted within said groove and adapted to be supported thereby, said resistor protruding beyond said groove so as to engage said contacts, and connecting means extending between one of said contacts and said voltmeter whereby the value of resistance associated with the voltmeter may be adjusted by rotating said dial member.

5. In a battery tester, supporting means, a voltmeter mounted on said supporting means, a dial member having an index on the front face thereof and rotatably mounted on said supporting means, said dial member being calibrated to indicate the plate sizes of the battery to be tested, a plurality of yieldable contacts arranged in a spaced relation adjacent the rear surface of said dial member, an arcuate shaped resistor carried by said dial member and adapted to engage said contacts, a pointer carried by said supporting means, and connecting means extending between one of said contacts and said voltmeter whereby the value of the resistance associated with the voltmeter may be changed by turning said dial member.

6. In an electrical testing apparatus for testing multiple cell storage batteries, means for placing a predetermined load on the battery to be tested, supporting means, a voltmeter mounted on said supporting means and connected across the battery terminals, means for indicating differences in the condition of the respective cells of the battery mounted on said supporting means in juxtaposition with said voltmeter, a dial member rotatably mounted on the supporting means and encircling said voltmeter and the means for indicating differences in the condition of the respective cells, said dial being operatively associated with the said voltmeter and calibrated to indicate the plate sizes of batteries to be tested, a plurality of contacts arranged in spaced relation on the supporting means in close proximity to the dial member, an arcuate shaped resistor carried by said dial member and adapted to engage said contacts and connecting means extending between one of said contacts and said voltmeter, whereby the value of resistance associated with the voltmeter may be changed by turning said dial member.

7. In an electrical testing apparatus, supporting means, a voltmeter mounted on said supporting means, a dial member rotatably mounted on said supporting means encircling said voltmeter and operatively associated with said voltmeter, said dial member being calibrated to indicate the plate sizes of the battery to be tested, a plurality of contacts arranged in spaced relations on the supporting means in close proximity to the dial member, an arcuate shaped resistor carried by said dial member adapted to engage said contacts and connecting means extending between one of said contacts and said voltmeter, whereby the value of resistance associated with the voltmeter may be changed by turning said dial member and indicia on said dial member to indicate the amount of resistance associated with the voltmeter.

JOHN H. KOLSETH.